(12) United States Patent
Ruid et al.

(10) Patent No.: US 7,223,455 B2
(45) Date of Patent: May 29, 2007

(54) DUCT BOARD WITH WATER REPELLANT MAT

(75) Inventors: John O. Ruid, Schwenksville, PA (US); Murray Toas, Norristown, PA (US); Wayne E. Shaw, Glenn Mills, PA (US)

(73) Assignee: CertainTeed Corporation, Valley Forge, PA (US)

( * ) Notice: Subject to any disclaimer, the term of this patent is extended or adjusted under 35 U.S.C. 154(b) by 111 days.

(21) Appl. No.: 10/342,849

(22) Filed: Jan. 14, 2003

(65) Prior Publication Data

US 2004/0137181 A1   Jul. 15, 2004

(51) Int. Cl.
*B32B 1/08* (2006.01)
*B32B 27/04* (2006.01)
*B32B 27/12* (2006.01)
*B32B 5/02* (2006.01)
*F16L 9/10* (2006.01)
*B29D 23/00* (2006.01)

(52) U.S. Cl. ............... 428/36.91; 428/34.4; 428/34.5; 428/34.6; 428/34.7; 428/35.7; 428/36.1; 428/36.9; 138/149; 138/137; 138/140; 138/141; 138/145; 138/146; 138/DIG. 4; 442/79; 442/82

(58) Field of Classification Search ............... 428/34.4, 428/34.5, 34.6, 34.7, 35.7, 36.1, 36.9, 36.91; 138/149, 137, 140, 141, 145, 146, DIG. 4; 442/79, 82

See application file for complete search history.

(56) References Cited

U.S. PATENT DOCUMENTS

| | | | |
|---|---|---|---|
| 2,341,130 A | 2/1944 | Unsworth | |
| 2,428,591 A | 10/1947 | Slayter | |
| 2,467,291 A | 4/1949 | Breisford et al. | |
| 2,619,151 A | 11/1952 | Sheidley | |
| 2,647,857 A | 8/1953 | Horne | |
| 2,695,855 A | 11/1954 | Stephens | |
| 2,768,026 A | 10/1956 | Stephens et al. | |
| 2,790,464 A | 4/1957 | Stephens et al. | |
| 2,825,389 A | 3/1958 | Stephens | |

(Continued)

FOREIGN PATENT DOCUMENTS

EP         0763690 A2    3/1997

(Continued)

OTHER PUBLICATIONS

Johns Manville product information for MICROLITE AA Blankets.*

(Continued)

*Primary Examiner*—Jennifer C. McNeil
*Assistant Examiner*—Chris Bruenjes
(74) *Attorney, Agent, or Firm*—Duane Morris LLP (57) ABSTRACT

A duct board or duct liner comprises: an insulating layer formed from fibrous material bound with a resin binder, an outer facing layer adhered to an outer surface of the insulating layer, and a water repellant mat facing adhered to an interior surface of the insulating layer opposite the outer surface to form a duct board material. The mat facing provides sufficient water repellency to repel a mixture of about 40% isopropanol and about 60% water. The duct board or duct liner material may be formed into a tubular shape capable of conducting air, with the mat facing on the interior of the tubular shape.

15 Claims, 4 Drawing Sheets

U.S. PATENT DOCUMENTS

| | | | |
|---|---|---|---|
| 2,881,110 A | 4/1959 | Walker et al. | |
| 2,938,737 A | 5/1960 | Walker | |
| 3,002,857 A | 10/1961 | Stalego | |
| 3,025,197 A | 3/1962 | Sheidley | |
| 3,092,529 A | 6/1963 | Pearson | |
| 3,093,037 A | 6/1963 | Ward, Jr. | |
| 3,212,529 A | 10/1965 | Ullman et al. | |
| 3,242,527 A | 3/1966 | Rosenberg | |
| 3,265,530 A | 8/1966 | Marzocchi et al. | |
| 3,394,737 A | 7/1968 | Hoffmann et al. | |
| 3,396,070 A | 8/1968 | Gambill et al. | |
| 3,420,142 A | 1/1969 | Gale et al. | |
| 3,492,771 A | 2/1970 | Jones et al. | |
| 3,507,730 A | 4/1970 | Gambill et al. | |
| 3,549,473 A | 12/1970 | Le Blanc et al. | |
| 3,557,840 A | 1/1971 | Maybee | |
| 3,605,534 A | 9/1971 | Barr | |
| 3,615,969 A | 10/1971 | Hegg | |
| 3,616,181 A | 10/1971 | Stalego | |
| 3,642,554 A | 2/1972 | Hensley | |
| 3,642,560 A | 2/1972 | Marsh, Jr. et al. | |
| 3,768,523 A * | 10/1973 | Schroeder | 138/141 |
| 3,861,425 A | 1/1975 | Clark | |
| 3,867,221 A | 2/1975 | Chant | |
| 3,885,593 A | 5/1975 | Koerber et al. | |
| 3,915,783 A | 10/1975 | Goppel et al. | |
| 3,942,774 A | 3/1976 | Sokolow | |
| 3,945,962 A | 3/1976 | Clark | |
| 3,980,511 A | 9/1976 | Proucelle | |
| 3,996,824 A | 12/1976 | Cailey | |
| 4,002,367 A | 1/1977 | Thomas | |
| 4,005,234 A | 1/1977 | Stroupe | |
| 4,070,954 A | 1/1978 | Cailey | |
| 4,101,700 A | 7/1978 | Ray, Jr. et al. | |
| 4,175,159 A | 11/1979 | Raleigh | |
| 4,179,808 A | 12/1979 | Smith | |
| 4,183,379 A | 1/1980 | Marquette et al. | |
| 4,196,755 A | 4/1980 | Kutnyak et al. | |
| 4,226,662 A | 10/1980 | McCort | |
| 4,243,075 A | 1/1981 | McPherson et al. | |
| 4,304,267 A | 12/1981 | Campbell, Jr. | |
| 4,310,585 A * | 1/1982 | Shannon | 428/218 |
| 4,389,587 A | 6/1983 | Levine et al. | |
| 4,456,637 A | 6/1984 | Takeda et al. | |
| 4,490,927 A | 1/1985 | Kissell | |
| 4,528,053 A | 7/1985 | Auer | |
| 4,573,715 A | 3/1986 | Armbruster | |
| 4,621,013 A | 11/1986 | Holtrop et al. | |
| 4,680,070 A | 7/1987 | Hughes | |
| 4,709,523 A | 12/1987 | Broderick et al. | |
| 4,758,395 A | 7/1988 | Zion | |
| 4,824,714 A | 4/1989 | Gest | |
| 4,839,222 A | 6/1989 | Jain | |
| 4,887,663 A | 12/1989 | Auxier et al. | |
| 4,895,745 A | 1/1990 | Vesley et al. | |
| 4,909,282 A | 3/1990 | Staugaard | |
| 4,947,958 A * | 8/1990 | Snyder | 181/296 |
| 4,968,556 A | 11/1990 | Jain | |
| 4,983,081 A | 1/1991 | Cunningham, Jr. | |
| 4,990,370 A | 2/1991 | Terry et al. | |
| 5,008,131 A | 4/1991 | Bakhshi | |
| 5,009,932 A | 4/1991 | Klett et al. | |
| 5,020,481 A | 6/1991 | Nelson | |
| 5,025,052 A * | 6/1991 | Crater et al. | 524/104 |
| 5,144,795 A | 9/1992 | Field | |
| 5,169,700 A | 12/1992 | Meier et al. | |
| 5,186,704 A | 2/1993 | Cunningham, Jr. | |
| 5,300,592 A | 4/1994 | Kanagawa et al. | |
| 5,310,594 A | 5/1994 | Holland et al. | |
| 5,314,719 A | 5/1994 | Batdorf et al. | |
| 5,370,919 A | 12/1994 | Fieuws et al. | |
| 5,371,989 A | 12/1994 | Lehnert et al. | |
| 5,379,806 A | 1/1995 | Matthews et al. | |
| 5,385,610 A | 1/1995 | Deerer et al. | |
| 5,391,840 A * | 2/1995 | Hughes et al. | 174/68.3 |
| 5,397,631 A | 3/1995 | Green et al. | |
| 5,421,938 A | 6/1995 | Cunningham, Jr. | |
| 5,460,206 A | 10/1995 | Sansoucy | |
| 5,487,412 A | 1/1996 | Matthews et al. | |
| 5,528,904 A | 6/1996 | Jones et al. | |
| 5,534,298 A | 7/1996 | Cross et al. | |
| 5,549,942 A | 8/1996 | Watts | |
| 5,567,504 A | 10/1996 | Schakel et al. | |
| 5,578,258 A | 11/1996 | Grant et al. | |
| 5,612,405 A * | 3/1997 | Bainbridge et al. | 524/510 |
| 5,624,471 A | 4/1997 | Gaeta et al. | |
| 5,625,999 A | 5/1997 | Buzza et al. | |
| 5,712,012 A | 1/1998 | Forman et al. | |
| 5,736,040 A * | 4/1998 | Duerrstein et al. | 210/437 |
| 5,776,841 A | 7/1998 | Bondoc et al. | |
| 5,783,268 A * | 7/1998 | Noonan et al. | 428/34.5 |
| 5,783,623 A | 7/1998 | Skoufis et al. | |
| 5,836,357 A | 11/1998 | Kittson et al. | |
| 5,953,818 A * | 9/1999 | Matthews et al. | 29/890.144 |
| 5,958,137 A | 9/1999 | Caldwell et al. | |
| 5,985,429 A | 11/1999 | Plummer et al. | |
| 6,000,437 A | 12/1999 | Ponder et al. | |
| 6,148,867 A | 11/2000 | Matthews et al. | |
| 6,207,245 B1 | 3/2001 | Miller et al. | |
| 6,213,522 B1 | 4/2001 | Jacobson et al. | |
| 6,231,927 B1 | 5/2001 | Ruid | |
| 6,270,865 B1 * | 8/2001 | Noonan et al. | 428/34.5 |
| 6,331,350 B1 | 12/2001 | Taylor et al. | |
| 6,383,623 B1 * | 5/2002 | Erb, Jr. | 428/299.7 |
| 6,451,432 B1 | 9/2002 | Azzopardi et al. | |
| 6,457,237 B1 | 10/2002 | Matthews et al. | |
| 6,555,951 B2 | 4/2003 | Jeoung | |
| 6,627,561 B1 * | 9/2003 | Wulliman et al. | 442/1 |
| 6,769,455 B2 * | 8/2004 | Toas et al. | 138/149 |
| 6,797,653 B2 * | 9/2004 | Fay | 442/85 |
| 2001/0033782 A1 | 10/2001 | Conley | |
| 2001/0033926 A1 * | 10/2001 | Matthews et al. | 428/316.6 |
| 2002/0127399 A1 | 9/2002 | Mankell et al. | |
| 2002/0146521 A1 * | 10/2002 | Toas et al. | 428/34.1 |
| 2003/0008092 A1 * | 1/2003 | Toas et al. | 428/36.91 |
| 2003/0032351 A1 | 2/2003 | Horner, Jr. et al. | |
| 2003/0056229 A1 | 3/2003 | Crabtree et al. | |
| 2003/0068943 A1 | 4/2003 | Fay | |
| 2003/0148693 A1 * | 8/2003 | Erb et al. | 442/391 |
| 2003/0211262 A1 * | 11/2003 | Ruid et al. | 428/36.1 |
| 2003/0236043 A1 * | 12/2003 | Calzavara et al. | 442/79 |
| 2004/0038608 A1 | 2/2004 | Shaw et al. | |
| 2004/0118472 A1 * | 6/2004 | Mota et al. | 138/149 |
| 2005/0031819 A1 | 2/2005 | Mankell et al. | |

FOREIGN PATENT DOCUMENTS

| | | | |
|---|---|---|---|
| EP | 1164006 A1 * | 12/2001 | |
| ES | 9402661 | 12/1994 | |
| FR | 1137652 | 6/1957 | |
| WO | WO 99/00338 | * | 1/1999 |

OTHER PUBLICATIONS

Johns Manville, Glass Fiber Mats, Elasti-Glass® 3200B Series, 1 p., Oct. 30, 2002.

Lydall, 40# Manniglas® 1886 BX Black, Develomental Lot F2434, Data Sheet, 1 p., Dec. 2001.

Lydall, 40# Manniglas® 1786 BX Black, Develomental Lot F2933, Data Sheet, 1 p., Nov. 20, 2002.

Lydall, 40# Manniglas® 1886 Black, Data Sheet, 1 p., Aug. 20, 2002.

Lydall, 23# Manniglas® 1803 WHB, Developmental Lot F2956, Data Sheet, 1 p., Nov. 20, 2002.

Johns Manville, Fiber Glass Mat (Acrylic Binder), Material Safety Data, Sheet ID: 1014, pp. 1-6, Oct. 21,2002.
Knauf Fiber Glass Insulation—Products, www.Knauffiberglass.com/index.cfm?fuseaction=prd.dspProdDetail&ID=14, pp. 1-6, Jan. 8, 2003.
Aircon, "Ventilation, Extraction and Air Conditioning - Installation Materials", Nov. 1991.
CertainTeed - CertaPro™ (FiberGlass Insulation), Commercial Insulation, ©2003 Certain Teed Corporation.
CertainTeed, "List Prices-ToughGard™Duct Board", Oct. 1, 1004, Valley Forge, Pennsylvania, USA.
CertainTeed, "Certain Teed Product Information," Certain Teed Building Solutions not later than Dec. 30, 2002.
CertainTeed Specification Sheet - CertaPro™ AcoustaBoard™ Black, Oct. 2002.
CertainTeed Specification Sheet - CertaPro™ AcoustaBlanket Black™, Oct. 2002.
CertainTeed Specification Sheet - CertaPro™ Acousta Therm™ Batts, May 2001.
CertainTeed Specification Sheet - CertaPro™ Commercial Board, May 2001.
CertainTeed Specification Sheet-CertaPro™ Partition Batts, Jun. 2002.
CertainTeed Specification Sheet-CertaPro™ Thermal Extended Flange Batts, Oct. 2002.
CertainTeed Specification Sheet-CertaPro™ Thermal Kraft Faced Batts, Oct. 2002.
CertainTeed Specification Sheet-Commercial Blanket Insulation, Apr. 2000.
CertainTeed Specification Sheet CrimpWrap™ Crimped Pipe and Tank Wrap, Dec. 2002.
CertainTeed Specification Sheet, FlameChek™ Duct Insulation, Apr. 2002.
CertainTeed Specification Sheet, FlameChek™ Plenum Insulation, Nov. 2002.
CertainTeed Specification Sheet, FlameChek™ Plus 2 Duct Insulation (Single Layer System), Apr. 2002.
CertainTeed Specification Sheet-OEM Acoustical Board Insulation, Mar. 2002.
CertainTeed, "Specification Sheet-ToughGard™ Duct Board", Apr. 2002.
CertainTeed Corporation, "Specification Sheet-ToughGard™ Duct Board with Enhanced Surface", Jan. 2002.
CertainTeed Corporation, "Specification Sheet ToughGard™ Duct Liner with Enhanced Surface", May 2001.
CertainTeed, Specification Sheet-ToughGard Rigid Liner Board with Enhanced Surface, Mar. 2002.
CertainTeed Corporation, Specification Sheet-Ultra*Duct™ Duct Board, Apr. 2001 or Mar. 2002.
CertainTeed, ToughGard™ Duct Board Fiber Glass Duct Board Systems.
CETIAT "Test Report" Jul. 24, 1991, 3 pages (translation attached).
Climaver 234 (1982).
Climaver 254 (1984).
Climaver 264 (1982).
Clamaver 284-234 "Construction and self-support air conditioning ducts", 4 pages (translation attached) (1988).
Climaver Plata, Specification of a Product, Relevance on first page, density 70 kg/m$^3$ (not translated) (1992).
Elasti-Glass® R3100B Series Glass Fiber Mats, Schuller, 2 pages (May 1997).
France-Air, "Glass Fibre panels for air ducts" (translation attached), 21 pages. (1992).
French Republic, National Testing Laboratory, Nov. 28, 1998, 1 page (translation attached).
Glasuld "Product Data-induatrial Sheet Black" Sheet: 172 p. 1, Nov. 1989, 1 page (translation of parts of the Danish ventilation attached).
Glasuld Ventilations-Kanaler.
IBACOS, Fibrous Glass Duct Board White Paper, 2003.
Isover "Gama Climaver".
Isover Gullfiber-translation of the relevant parts of the Danish ventilation duct product "Industriplad Sort" and the corresponding Ventilation Duct Application brochure.
Isover Gullfiber-translation of the relevant parts of the Swedish Product Catalogue for Technical Insulation Mar. 1989.
Isover "Price List" Jan. 1991, (translation attached).
Isover Roclaine, "Recommended Prices Jan. 1990," Cristaleria Espanola S.A., Insulation Division, Jan. 1993, 3 pages (translation attached.).
Isover Roclaine, "Recommended Prices, Jan. 1991," Cristaleria Espanola S.A., Insulation Division, Jan. 1993, 3 pages (translation attached).
Isover Roclaine, "Recommended Prices Jan. 1993," Cristaleria Espanola S.A., Insulation Division, Jan. 1993, 3 pages (translation attached).
Isover Saint-Gobain Roche & Verre-Insulation and Air Conditioning, Mar. 1990, 3 pages (translation attached).
Johns-Manville, "Air Handling Systems-Linacoustic RC™ Fiber Glass-Duct Liner, with Reinforced Coating System," (Preliminary Product Information), AHS-329 Feb. 2002.
Johns-Manville, "Air Handling Systems-SuperDuct™ Coated High Performance Air Duct Board," Type 475 & 800, AHS Jun. 2000, U.S. Appl. Nos. 5,379,806 and 5,487,412.
Johns-Manville, "SuperDuct™" Air Duct Board Fabrication Instructions, AHS-204, Feb. 1998.
Johns-Manville Fiber Glass, "Micro-Aire Duct Systems Fabrication Manual", USA (Jun. 1970).
Johns-Manville Manufacturing, "Finished Product Specification-Mat Faced Mad Board Spec No. 4365-15.6", 1971-1973, USA.
Johns-Manville Manufacturing Specification-Product Specification-"Micro-Aire Duct Board Standard Duty Heavy Duty Spec No. 4365-20", Oct. 7, 1971, USA.
Knauf Air Duct Board, Form No. AH-SS-2 Effective: Jan. 1998, 2 pages.
Knauf, Air Duct Board-M with Hydroshield™ Technology, Submittal Sheet, Form No. AH-SS-6, Oct. 2000.
Knauf Fiber Glass Insulation-Products, Knauf Air Duct Board-M www.Knauffiberglass.com/index.cfm?fuseaction=prd.dspProdDetail7id=14, pp. 1-7, Jan. 8, 2003.
Mid-rise and High-rise Exterior Building Envelope Board, Current System-Massachusetts "specificaitons".
North American Insulation Manufacturers Association, "Fabrication Dimensions for 2" (R-8.7) Fibrous Glass Duct Board, Pub. No. AH-136, Aug. 2002.
North American Insulation Manufacturers Association, "Facts About Using Sealants in Fiber Glass Air Handling Systems", Insulation Facts #36, Pub. No. AH 125, Sep. 2000.
North American Insulation Manufacturers Association, "Fibrous Glass Commercial Insulation Boards", Insulation Facts #67, www.naima.org, Jan. 2003.
North American Insulation Manufacturers Association, "Fibrous Glass Duct Construction Standards", 2$^{nd}$ Edition, 1993.
North American Insulation Manfacturers Association, "Fibrous Glass Duct System", Insulation Facts #64, Pub. No. AH 137, Jan. 2003.
North American Insulation Manufacturers Association, "Fibrous Glass Duct Wrap", Insulation Facts #66, www.naima.org, Jan. 2003.
Owens Corning, "Submittal Sheet-Aeromat® Duct Liner", May 2001, USA.
Owens Corning, "Submittal Sheet-EnDura Coat Duct Board", May 2001, USA.
Precision Coating Rods and Laboratory Products, Industry Tech, Oldsmar, FL.
RD Specialties, "Smooth Stainless Steel Rods, etc,", Webster, NY.
ROXUL®-The Better Insulation™-Technical Product Information, Board Insulation 15080 RHT™605, ROXUL, Inc., Jun. 01, 2002.
Testing Data from the Competitive Audit on Mar. 25, 1999, 3 pages.
Undeerwriters Laboratories Inc., "Gas and Oil Equipment 1993®".
Underwriters Laboratories Inc., "Gas and Oil Equipment 1994®".
Underwriters Laboratories Inc., "Gas and Oil equipment 1995®".
Underwriters Laboratories Inc., "Investigation of 'Climaver 284' Air Duct Board", Dec. 19, 1991, Northbrook, Illinois, USA.

Underwriters Laboratories Inc., "Report on Air Ducts", Jun. 8, 1992, Northbrook, Illinois, USA.

Weiss, Herbert L., Coating and Laminating, Converting Technology Company, Milwaukee, Wisconsin, pp. 7-9, 196-202. (1977).

"Wire Wound Rod," Lembo-ITTI, http://www.lembo-itti.com/fx170005.htm Oct. 20, 1998.

ROXUL®-The Better Insulation™-Technical Product Information, board Insulation 15080, RHT#606, ROXUL, Inc. 2 pp., Jun. 01, 2002.

* cited by examiner

DUCT BOARD WITH WATER REPELLANT MAT

FIELD OF THE INVENTION

The present invention relates to building products in general and, in particular, to duct board and duct liner materials and ducts made therefrom.

BACKGROUND

Ducts and conduits are used to convey air in building heating, ventilation and air conditioning (HVAC) systems. In many applications, especially in commercial and industrial construction, the ducts are lined with flexible thermal and sound insulating material. The lining enhances the thermal efficiency of the duct work and reduces noise associated with movement of air therethrough. Duct liner may comprise any suitable organic material or inorganic material, e.g., mineral fibers such as fiber glass insulation or the like. Typical fiber glass duct liners, for example, are constructed as fiber glass mats having densities of about 1.5 to 3 pounds per cubic foot (pcf) and thicknesses of about 0.5 to 2 inches. To prevent fiber erosion due to air flow, the insulation may include a coating of on its inner or "air stream" surface. The air stream surface of the insulation is the surface that conveys air through the duct and is opposite the surface that contacts the duct sheet metal in the final duct assembly. The coating also serves to protect the insulation during brush and/or vacuum cleaning of the interior of the duct. Examples of duct liners having coatings on their inner surfaces are provided in U.S. Pat. Nos. 3,861,425 and 4,101,700. Several coated insulation duct liners are marketed under the trade designations Toughgard® by Certain-Teed Corp. of Valley Forge, Pa., Aeroflex® and Aeromat® by Owens Corning Fiberglas Corp. of Toledo, Ohio, Permacote®, and Polycoustic™ by Johns Manville Corp. of Denver, Colo.

Other insulated HVAC systems use ducts either fabricated from or lined with rigid duct boards or tubes. Duct boards are rigid members formed from resin-bonded mineral fibers and whose air stream surfaces may also be provided with protective coatings. Duct boards typically have densities of about 3 to 6 pounds per cubic foot (pcf) and thicknesses of between about 0.5 to 2 inches. Coated and uncoated duct boards are marketed under a variety of trade designations from the aforementioned manufacturers of duct liners. Whether provided on duct liners or duct boards, dedicated water-resistant coatings add to the cost and complexity of manufacturing these products.

It is well known that microorganisms will grow in an environment where moisture and nutrients are present and that many species of microorganisms have a negative impact on indoor air quality (IAQ). If liquid water leaks into air duct insulation, the water may collect and stagnate in the insulation and support the growth of microorganisms.

To address the problem of microorganism growth in HVAC systems, U.S. Pat. Nos. 5,314,719; 5,379,806; 5,487,412 and 5,783,268 disclose providing antimicrobial agents on or in the air-conveying surfaces of impermeable duct liners and/or duct boards. However, these antimicrobial agents have very limited zones of effectiveness. That is, they tend to prevent microbe formation only in their immediate vicinity. U.S. Pat. No. 5,314,719, for example, describes a zone of antifungal inhibition of about one millimeter. Typical duct liners and duct boards have insulation thicknesses ranging from about one-half to two inches. In these products, such a limited zone of inhibition would be essentially useless in preventing microorganism formation caused by duct insulation that becomes saturated by water entering through the exterior walls and seams of the duct.

Moisture impermeable coatings, if applied to the airstream surface of air duct insulation products, inhibit ingress of water into the insulation and attendant microorganism formation therein. U.S. Pat. No. 3,861,425 discusses providing HVAC ducts either composed of or lined with fibrous glass insulation media such as batts, mats, boards or the like with such coatings. While certain coatings may provide the benefits of fiber erosion protection and moisture resistance, they add to the cost and complexity of the products and their methods of manufacture. Coatings applied to the air stream surface of fibrous insulation products are applied to those products after their formation. This requires application of the coating to the previously formed insulation product by brush, roller, sprayer or by some other means or method and thereafter allowing the coating to cure or dry. This post-formation coating step may prolong the time required to manufacture the insulation product and, whether performed manually or automatically, must be carefully monitored in order to assure uniformity in application of the coating.

As an alternative to coated duct liners and duct boards, at least CertainTeed Corp. and Knauf Fiber Glass GmbH offer duct liners or duct boards having glass fiber insulation covered with a layer of non-woven facing material which defines the air stream surface of those products. The facing material produces a durable surface that protects the air duct from fiber erosion.

However, both uncoated fibrous insulation HVAC duct products and some products that are covered with facing material possess limited inherent moisture resistance. Consequently, they are susceptible to microorganism formation in the event they become wet.

SUMMARY OF THE INVENTION

A duct board or duct liner product comprises: an insulating layer formed from fibrous material bound with a resin binder, an outer facing layer adhered to an outer surface of the insulating layer, and a water repellant mat facing adhered to an interior surface of the insulating layer opposite the outer surface to form a duct board material. The mat facing provides sufficient water repellency to repel a mixture of at least about 40% isopropanol and about 60% water.

DETAILED DESCRIPTION

Application Ser. No. 09/789,063, filed Feb. 20, 2001, and application Ser. No. 09/788,760, filed Feb. 20, 2001 are incorporated by reference herein in their entireties.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 1:
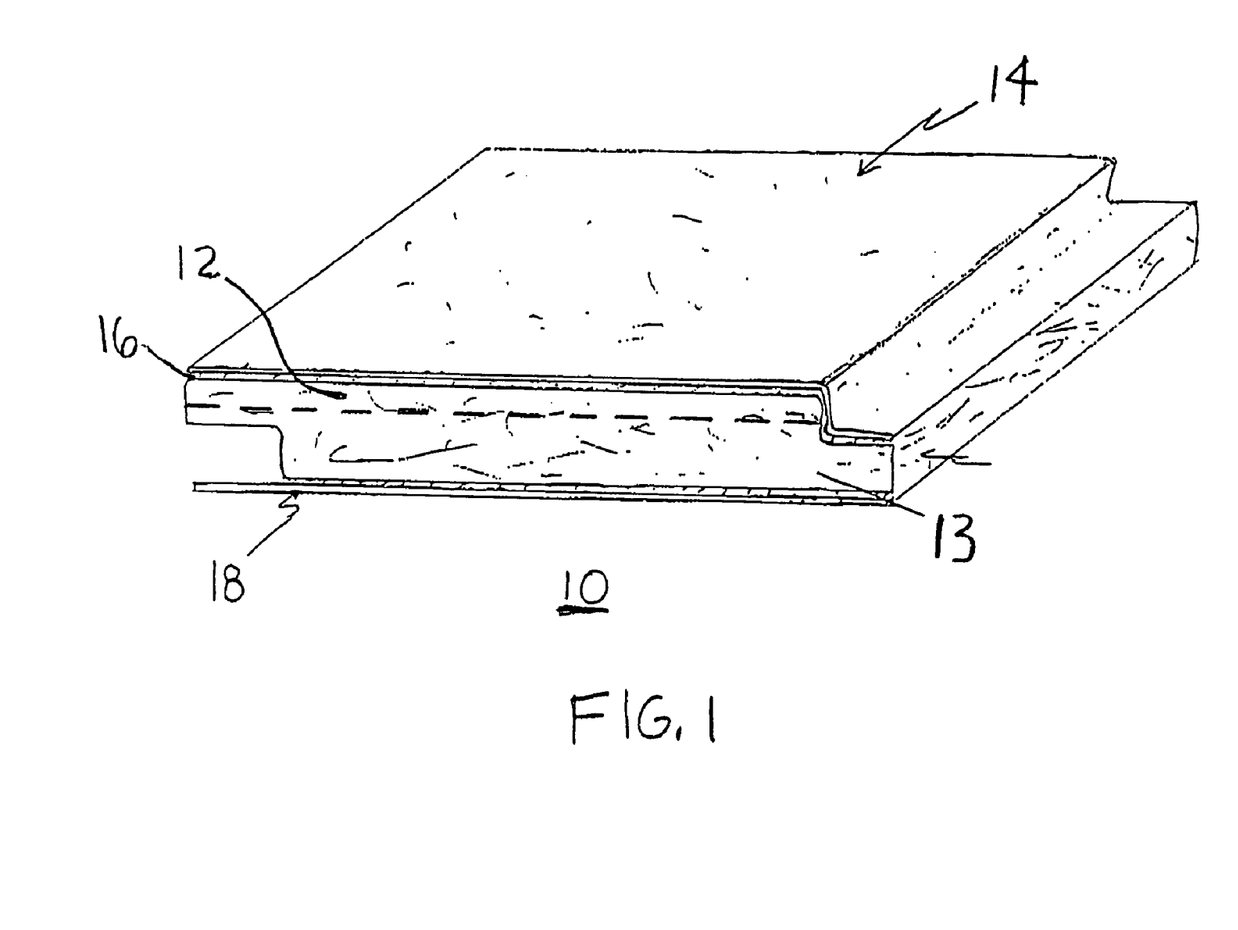
FIG. 1 is a cross sectional view of a duct board material according to one embodiment.
Figure 4:
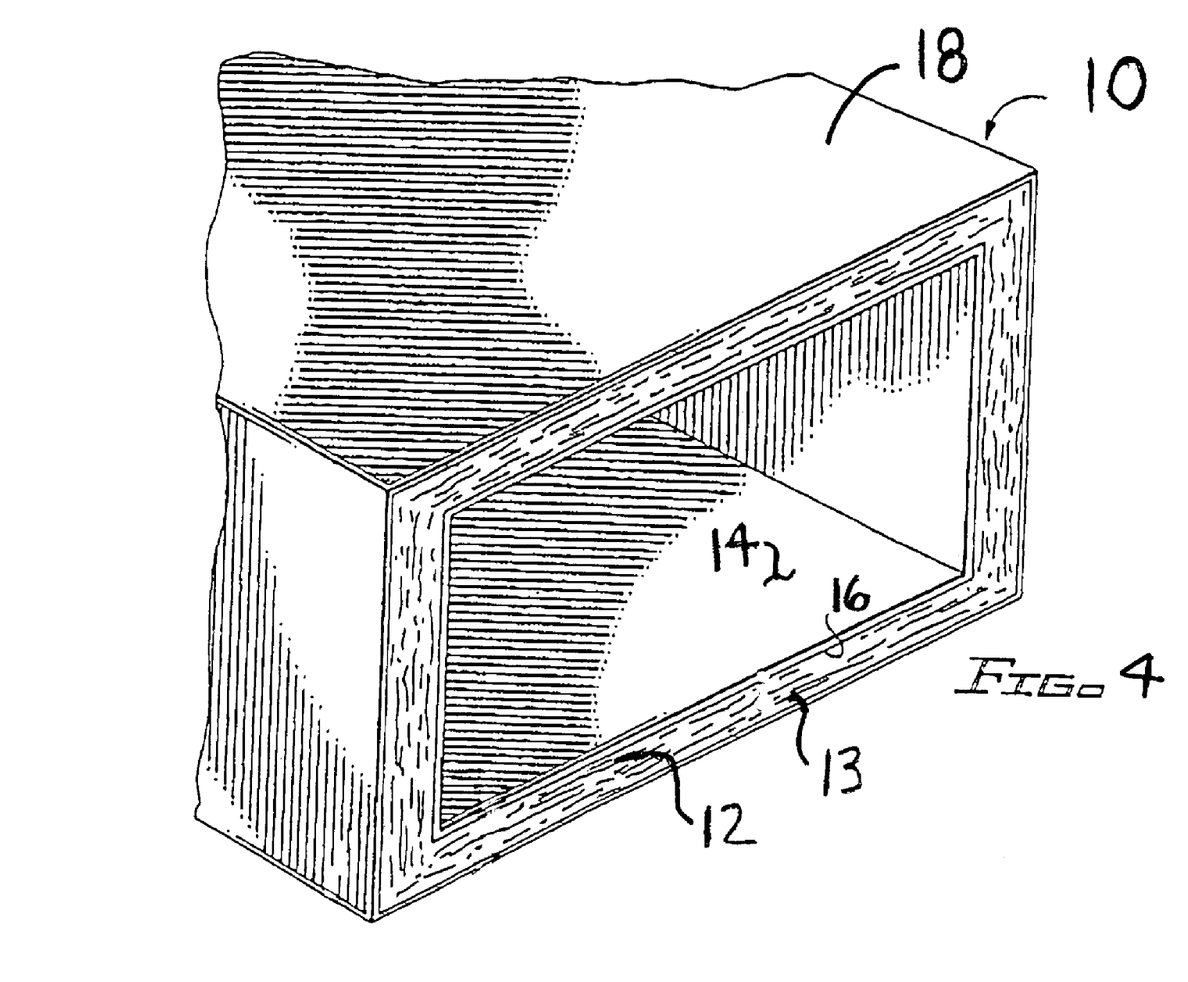
FIG. 4 is an isometric view of the duct board of FIG. 1, after it is folded into an air duct.

FIG. 1 is a cutaway view of a portion of a duct board or duct liner material 10. A duct board or duct liner 10 comprises an insulating layer 12, 13 formed from fibrous material bound with a resin binder, an outer facing layer 18 adhered to an outer surface of the outer insulating layer portion 13 and a water repellant mat facing 14 adhered to an interior surface of the inner insulating layer portion 12 opposite the outer surface 18 to form a duct board or duct liner material. The mat facing 14 provides sufficient water repellency to repel a mixture of about 40% isopropanol and about 60% water. The mat facing 14 may optionally provide sufficient water repellency to repel a mixture of greater than 40% isopropanol. The duct board or duct liner material 10 is formed into a tubular shape capable of conducting air, with the mat facing 14 on an interior thereof. FIG. 4 shows an exemplary air duct formed from the duct board 10. A duct liner would have a similar appearance, but would have a lower density suitable for placement inside a duct. Although a rectangular duct is shown the duct may be formed into a non-rectangular tubular shape, as is known in the art.

The mat facing 14 may be formed from a woven or non-woven fiber material. The material may be inherently water repellant, or it may be treated with a water repellant material that includes a treatment such as silicone or fluorocarbon, for example, to provide the desired water repellency.

A preferred mat material 14 has a water repellency sufficient to repel a drop including at least 80% isopropyl alcohol and water for a minimum of five minutes, using an IST 80.6–92 test method. Materials that repel up to 100% isopropyl alcohol in an IST 80.6–92 test may be used. In some preferred embodiments, the mat 14 is formed from water repellant 40# Manniglass 1886 Black mat or 1786 Black mat from Lydall Inc. of Green Island, N.Y. or water repellant Elasti-Glass® 3220B mat from Johns Manville of Denver, Colo.

In other embodiments, the mat 14 is formed from filament glass fibers in an acrylic-based binder, such as Johns Manville Dura-Glass® 8440 with a water repellant coating (e.g., silicone or fluorocarbon) applied thereto.

Other mat materials providing similar or better degrees of water repellency may alternatively be used. For example, such materials may include non-woven mats of glass fibers randomly dispersed into a web in a wet-laid process, bound in an acrylic or other resin system, and post treated with a fluorocarbon based coating that provides the desired degree of water repellency.

Product 10 comprises an insulating layer 12, 13 of mineral fibers such as glass fibers, refractory fibers or mineral wool fibers bonded by a suitable resin and mat facing 14 of adhered thereto by adhesive 16, wherein the facing material 14 defines the air stream surface for the board or tube. Binders that may be used to bind the fibers of insulating layer 12, 13 may include, without limitation, the phenolic binders disclosed in U.S. Pat. Nos. 5,300,562 and 5,473,012, the disclosure of which are incorporated herein by reference. Product 10 may have a density of about 0.5 to 6 pounds per cubic foot (pcf) and a thickness of between about 1.27 to 5.08 centimeters (0.5 to 2 inches). The thickness and density of insulation layer 12, 13 is dictated by whether the product is a duct board or duct liner, and is also influenced by the levels of acoustic and/or thermal insulation that are desired or necessary for a particular building installation. One of ordinary skill in the art understands that other known duct liner fabrication process may be used.

Although the piece of duct board material shown in FIG. 1 has a female shiplap edge and a male shiplap edge with a strip of the outer facing layer 18 overhanging the male shiplap edge, other configurations are formed with or without shiplap edges.

In some embodiments, the water repellant mat facing 14 alone provides the desired degree of water repellency. In other embodiments, as described below, the water repellency of the product 10 is enhanced by an additive in either the binder of the insulation layer 12, 13, the adhesive joining the facing 14 to the insulation 12, or both.

As will be appreciated by reference to FIG. 1, the insulation layer 12, 13 is formed as a series of accumulated layers of resin-bonded fibers which, in the end product, may be intertwined and appear and exist as a continuous homogeneous mass rather than as a plurality of distinct or discrete strata or lamina. For simplicity of illustration and explanation, product 10 is referred to below as comprising first and second portions 12 and 13, although typical rigid duct boards and tubes include many bound layers. The location of the dashed line between portions 12 and 13 is optional. In some embodiments, portions 12 and 13 are continuous and of identical composition, and may be considered a single layer. In other embodiments, as described below, portion 12 has an additive not contained in portion 13. In some embodiments, portion 12 is thicker. In other embodiments, portion 13 is thicker.

In some embodiments, the water repellency of the duct board or tube is optionally enhanced by incorporating a hydrophobic agent into the binder of at least one of the portions 12, 13. In one example, the hydrophobic agent is incorporated into portion 12 which is closer to the air stream surface of product 10, and adjacent to the facing 14; portion 13 does not have the hydrophobic agent in the binder thereof. In this way, liquid water or other aqueous liquids from the interior of the duct which penetrates facing 14 is further repelled from entering product 10, thereby reducing the likelihood of microbial growth in the insulation. Preferably, a foil/scrim/paper laminate or other suitable vapor retarder layer 18 is adhered or otherwise affixed to the face of product opposite the air stream surface of layer 12 to prevent moisture from entering the insulation from the ambient environment.

Figure 2:
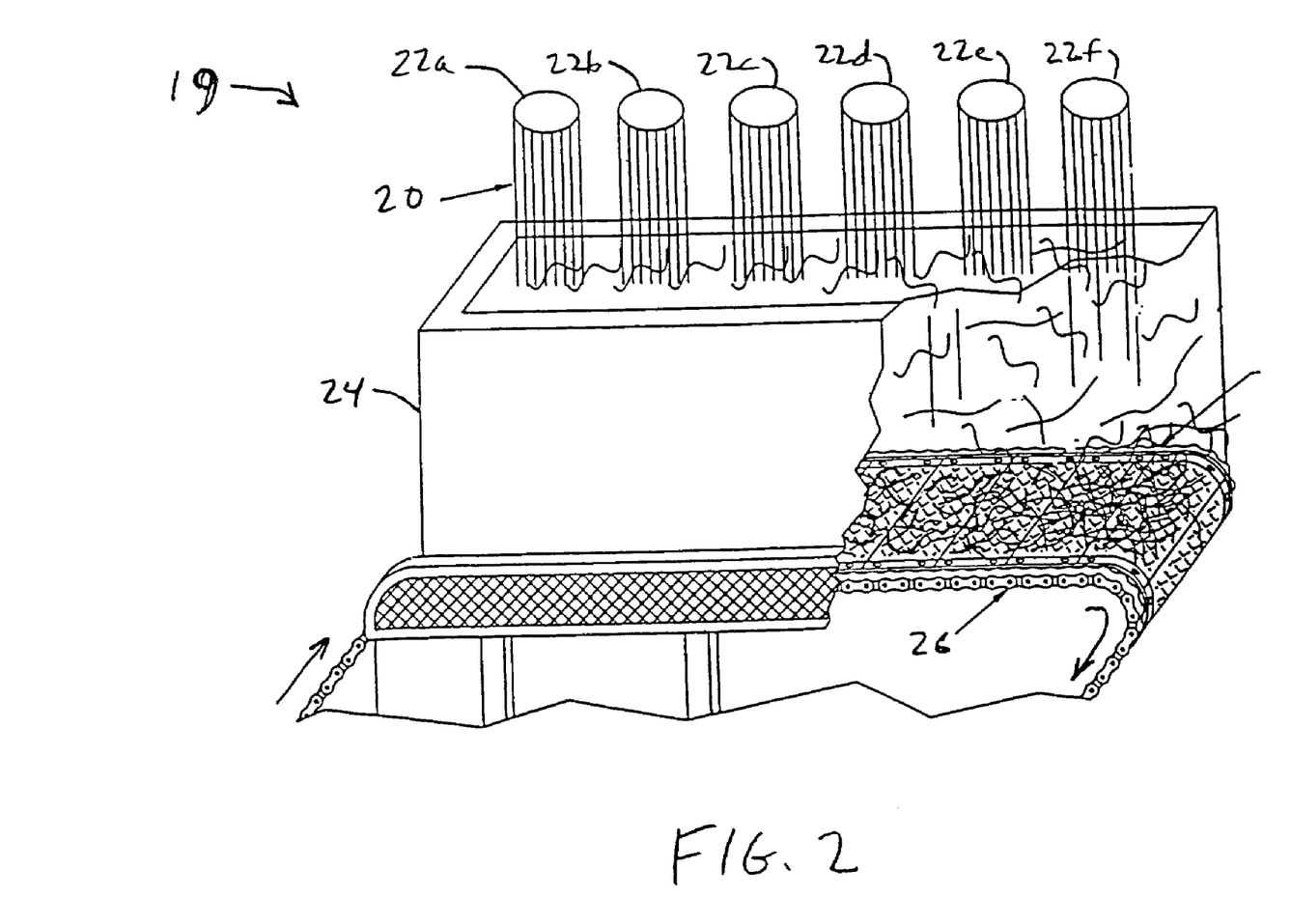
FIG. 2 is a diagram of apparatus for forming the insulation layer of the material shown in FIG. 1.

FIG. 2 shows a forming section for forming the insulating layer 12, 13 which includes the optional hydrophobic agent in the binder of portion 12. Insulation layers 12 and 13 may be made in forming section 19 by melt spinning molten material, such as glass, into veils 20 of fine fibers using a plurality of fiberizing units 22a–22f. The veils of fibers enter a forming hood 24 where a binder, such as a phenolic resin, in an aqueous carrier (or water and binder in sequence) is sprayed onto the veils 20. In the forming hood 24, fibers are accumulated and collected as a web on a chain, belt or other conventionally-driven conveyor 26. In order to impart hydrophobicity to portion 12, at least fiberizing unit 22f is configured to dispense binder having a hydrophobic agent incorporated therein. After the web exits the forming section 19, it is conveyed to an unillustrated conventional curing oven for compressing and curing the web to a desired thickness and density.

While in the oven, portions 12, 13 are simultaneously heated in order to cure the binder and adhere the portions to one another so as to form the homogeneous mass of product 10. Preferably, the multiplicity of layers of fibers are held together by unillustrated heated platens or the like under sufficient pressure to compress the mass of fibers in portions 12 and 13 against each other. After product 10 exits the curing oven, vapor retarder layer 18 is applied to the surface of layer 13 opposite the air steam surface.

In some embodiments, the binder used in at least portion 12 includes at least one hydrophobic agent such as silicone, oil, fluorocarbon, waxes or the like in an effective amount sufficient to render the product water repellent and resistant to aqueous solutions containing moderate quantities of solvent regardless of the water repellency of the airstream facing layer 14. Depending upon the hydrophobic agent selected, effective amounts of hydrophobic agent may range in a ratio of about 1:200 to 1:5 hydrophobic agent to binder. In one embodiment, a commercially available hydrophobic agent suitable for these purposes is DC 347 silicone emulsion manufactured by Dow Corning Corporation of Midland, Mich. Good water repellency characteristics have been shown when this agent is present in a ratio of about 1:24 relative to phenolic resin binder. Alternative hydrophobic agents suitable for use with phenolic resin include Mulrex®, an oil emulsion marketed by the Mobil Oil Corporation of Fairfax, Va. and stock number SL 849 oil marketed by Borden Chemical, Inc. of Columbus, Ohio. Good water repellency characteristics have been shown when Borden® SL 849 oil is present in a ratio of about 1:16 relative to phenolic resin binder.

Although an example is described above in which one portion 12 of the insulating layer includes a hydrophobic agent in the binder thereof, and another portion 13 of the insulating layer does not include a hydrophobic agent in the binder thereof, other embodiments include the hydrophobic agent in the binder of the entire insulating layer 12, 13. As noted above, if the mat facing 14 provides the desired water repellence (alone or in combination with a water repellant adhesive 16), then neither portion 12 or 13 requires a hydrophobic agent.

An exemplary rotary process described above is advantageous for making a duct board product. In the case of duct liner product, a similar flame attenuated process is used. Alternatively, a duct liner product can be fabricated using a textile mat forming process, in which textile fibers in continuous strands are chopped into 2 to 5 inch lengths and formed into a mat or board by an air-laid process. A hydrophobic agent such as a silicone, fluorocarbon or wax may be added to the powdered binder used in this process.

In some embodiments, the water repellency of the duct board or tube 10 is enhanced by incorporating a hydrophobic agent into adhesive 16. In this way, liquid water or other aqueous liquids in the interior of the duct which penetrate facing 14 are repelled from entering the interior portion 12 of the insulation layer 12, 13 thereby further reducing the likelihood of microbial growth in the insulation.

Figure 3:
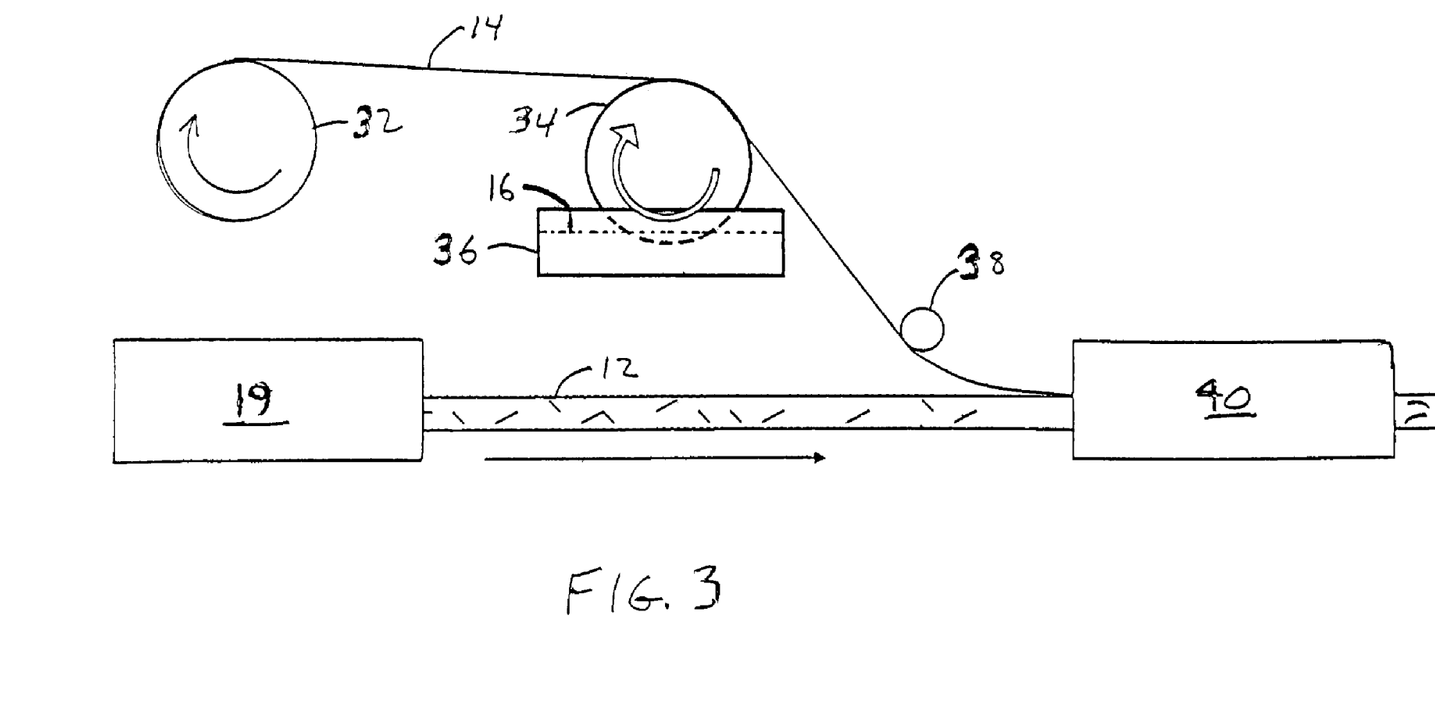
FIG. 3 is a diagram of apparatus for applying the mat facing to the duct board material shown in FIG. 1.

Referring to FIG. 3, insulation layer 12, 13 may be made in a forming station 19 as described above, by melt spinning molten material, such as glass, into fine fibers, and spraying a binder, such as a phenolic resin binder in an aqueous carrier, onto the fibers, and collecting the fibers as a web on a conveyor. The web is then passed through a conventional curing oven or other means for curing and compressing the web to a desired thickness after the web exits the forming station. Note that portion 13 is not shown in FIG. 3. For purpose of this example, it is optional, but not necessary, to have distinguishable portions 12, 13 in the insulating layer.

In some embodiments, a continuous web of facing layer 14 is dispensed from a roll 32 and is applied to one surface of insulation layer 12 prior to curing of the binder in the insulation. Prior to adhering the facing layer 14 to the insulation layer 12, an adhesive 16 is applied to either or both of the facing layer 14 and the insulation layer 12. Adhesive 16 may be continuously applied to the underside of facing layer 14 via an applicator roll 34 rotatably supported in a pan 36 or similar receptacle which contains adhesive appropriate for securely adhering layers 12,14 to one another following curing. It will be understood that adhesive 16 may be applied to either or both of layers 12, 14 by other means such as spraying or brushing.

In applying adhesive, care should be taken to minimize the amount of adhesive 16 that penetrates through the facing all the way through to the (inner) airstream surface of facing 14 and becomes deposited on that surface. Adhesive 16 on the inner surface of mat 14 may present a more wettable surface than the bare facing 14. Thus, if the airstream surface is partially or totally coated with adhesive 16, this may increase the surface tension of the surface and reduce water repellence below that of bare facing 14.

Although not limited thereto, a preferred adhesive is a phenolic resin having generally the same or similar composition as the binder that is used to bind the fibers in insulation layer 12. However, phenolic resin adhesives have limited hydrophobicity.

Accordingly, the adhesive used to attach facing 14 to insulation layer 12 may optionally include at least one hydrophobic agent such as silicone, oil, fluorocarbon, waxes or the like in an effective amount sufficient to render the product essentially impermeable to water and resistant to aqueous solutions containing moderate quantities of solvent, regardless of the water repellency of the facing 14. Effective amounts of hydrophobic agent may range in a ratio of about 1:20 to 1:200, and more preferably about 1:40, hydrophobic agent to binder. A commercially available hydrophobic agent suitable for these purposes is DC 347 silicone emulsion manufactured by Dow Corning Corporation of Midland, Mich.

The layers 12, 14 may travel at any desired synchronous speed and the applicator roll 24 may be rotated at any speed sufficient to thoroughly apply the adhesive 16 to the underside of the moving facing layer web 14. Acceptable results have been demonstrated at a moving layer speeds of about 80 feet per minute coupled with applicator roll 34 rotation speeds of about 3–20 rpm. A placement means 38 such as an idler roller or the like may be used to facilitate placement of the layer 14 on layer 12. Product 10 is then passed by an unillustrated conveyor to a curing oven 40. While in the oven, layers 12,14 are simultaneously heated in order to cure the binder and adhesive 16. Preferably, layers 12,14 are held together by unillustrated heated platens or the like under sufficient pressure to compress the facing layer 14 against the insulation layer 12. Heating the two layers under compression securely bonds the facing layer 14 to the thermal insulation layer 12. Vapor retarder layer 18 (shown in FIG. 1) may be applied to the surface of insulation layer 12 opposite facing layer 14 after the insulation board exits the curing oven.

EXAMPLE

Samples were constructed with facing 14 made of Johns Manville 3220B and Lydall Manniglass 1886, on a fiber glass insulation board with a phenolic binder. The samples were constructed at different conveyor line speeds of 80 and 92 feet per minute (which affects the density of the insulating layer 12). In these samples, hydrophobic agents were not added to the binder of insulating layer 12, or to the adhesive 16. The results of evaluating the boards' water repellency by placing drops of water and water/alcohol solutions on the surface of the board were as set forth in Table 1. Test results for a commercially available Knauf Air Duct Board—M with Hydroshield Technology EI475 duct board are also provided for comparison. The term "OK" indicates that droplets did not penetrate the surface in the referenced period of time.

TABLE 1

| | Board Sample | | | | |
|---|---|---|---|---|---|
| | JM 3220B @ 80 feet/minute | JM 3220B @ 92 feet/minute | Lydall 1886 @ 80 feet/minute | Lydall 1886 @ 92 feet/minute | Knauf Hydroshield |
| Water (100%) | OK > 1 hour | OK > 1 hour | OK > 1 hour | OK > 1 hour | OK 15 min |
| 10% Isopropanol | OK > 1 hour | OK > 1 hour | OK > 1 hour | OK > 1 hour | OK 15 min |
| 20% Isopropanol | OK > 1 hour | OK > 1 hour | OK > 1 hour | OK > 1 hour | OK 15 min |
| 30% Isopropanol | OK > 1 hour | OK > 1 hour | OK > 1 hour | OK > 1 hour | Soaked immediately (<1 minute) |
| 40% Isopropanol | OK > 1 hour | OK > 1 hour | Some soaked in <5 minutes | OK > 15 minutes | Soaked immediately (<1 minute) |
| 50% Isopropanol | OK > 1 hour | OK > 1 hour | Some soaked in <5 minutes | Some Soaked in <15 minutes | Soaked immediately (<1 minute) |

An extended test was conducted on the sample prepared using JM 3220B with a line speed of 80 feet/minute. The sample was placed under running tap water for over seven hours, at an angle of approximately 60 degrees from the horizontal, and water dripped from a height of 13.3 centimeters (5.25 inches). After seven hours, there was no penetration of water except for the bottom edge of the board, where water soaked in about 2.5 centimeters (1 inch) from the edge (In the sample, the mat did not wrap around the bottom edge, so the bare insulation material was exposed directly to the running/dripping water stream). A cross section of the board showed that the portion of the board directly under the drip of water appeared dry.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A duct board or duct liner product, comprising:
   an insulating layer formed from fibrous material bound with a resin binder;
   an outer facing layer adhered to an outer surface of the insulating layer; and
   a water repellant mat facing adhered to an interior surface of the insulating layer opposite the outer surface to form a duct board material, the mat facing providing sufficient water repellency to repel a mixture of at least about 40% isopropanol and about 60% water,
   wherein the mat facing comprises non-woven glass fibers bound with an acrylic resin with a water repellant fluorocarbon or silicone.

2. The duct board or duct liner of claim 1, wherein the mat facing further comprises a water repellant fluorocarbon coating thereon.

3. The duct board or duct liner of claim 1, wherein the resin binder in at least a portion of said insulating layer is formed from a resin in an aqueous carrier mixed with a hydrophobic agent in emulsion form.

4. The duct board or duct liner of claim 3, wherein the hydrophobic agent is present in said binder in a ratio of about 1:200 to 1:5 hydrophobic agent to binder.

5. The duct board or duct liner of claim 4, wherein said hydrophobic agent is selected from the group consisting of silicone, oil, fluorocarbon and waxes.

6. The duct board or duct liner of claim 1, wherein:
   the mat facing is adhered to a surface of said insulating layer by an adhesive containing a first hydrophobic agent, and
   the resin binder in at least a portion of said insulating layer contains a second hydrophobic agent.

7. The duct board or duct liner of claim 6, wherein the first hydrophobic agent is one of the group consisting of silicone, oil, fluorocarbon and waxes.

8. The duct board or duct liner of claim 6, wherein the resin binder in the portion of said insulating layer is formed from a resin in an aqueous carrier mixed with the second hydrophobic agent in emulsion form.

9. The duct board or duct liner product according to claim 1, wherein the duct board material is formed in a tubular shape capable of conducting air, with the mat facing on an interior thereof.

10. The duct board or duct liner of claim 1, wherein the mat facing is a material that provides sufficient water repellency to repel up to 80% isopropyl alcohol in an alcohol/water drop test.

11. The duct board or duct liner of claim 1, wherein the mat facing is a material that provides sufficient water repellency to repel up to 100% isopropyl alcohol in an alcohol/water drop test.

12. The duct board or duct liner of claim 1, wherein the resin binder in at least a portion of said insulating layer comprises a polydimethylsiloxane emulsion in a ratio of about 1:200 to 1:5 hydrophobic agent to binder.

13. A duct board or duct liner product, comprising:
   an insulating layer formed from fibrous material bound with a resin binder;
   an outer facing layer adhered to an outer surface of the insulating layer; and
   a water repellant mat facing adhered to an interior surface of the insulating layer opposite the outer surface to form a duct board material, the mat facing providing sufficient water repellency to repel a mixture of at least about 40% isopropanol and about 60% water, facing comprises
wherein the mat facing comprises non-woven glass fibers bound with an acrylic resin with a water repellant fluorocarbon or silicone,
wherein the resin binder in at least a portion of said insulating layer is a phenolic resin and the water repellant mat facing is adhered to the interior surface using an adhesive comprising the same phenolic resin as the resin binder in said portion of said insulating layer and a hydrophobic agent.

14. The duct board or duct liner of claim 13, wherein said hydrophobic agent is one of the group consisting of silicone, oil, fluorocarbon and waxes.

15. The duct board or duct liner of claim 13, wherein said hydrophobic agent is present in said adhesive in a ratio of about 1:20 to 1:200 hydrophobic agent to binder.

* * * * *